Dec. 2, 1952 — R. F. TOLAN — 2,620,107

PORTABLE BEVERAGE DISPENSER

Filed Sept. 23, 1949

Ronald F. Tolan
Inventor
Haynes and Koenig
Attorneys

Patented Dec. 2, 1952

2,620,107

UNITED STATES PATENT OFFICE 2,620,107

PORTABLE BEVERAGE DISPENSER

Ronald F. Tolan, Maplewood, Mo., assignor to Robert P. Dickinson, Robertson, Mo.

Application September 23, 1949, Serial No. 117,469

7 Claims. (Cl. 225—21)

This invention relates to portable beverage dispensers and more particularly to portable apparatus for mixing and dispensing carbonated beverages.

Among the several objects of the invention may be noted the provision of a portable beverage dispenser for mixing and dispensing carbonated beverages readily adapted to be carried by a vendor of drinks and to dispense a relatively large number of individual mixed drinks, which may be of different flavors, from one filling of the dispenser, and utilizing solidified carbon dioxide both as a refrigerant for cooling the beverage and as a source of carbon dioxide gas for carbonating water to be used in mixing the beverage or beverages. In general, the invention comprises a portable vessel for containing water, a receptacle for containing solidified carbon dioxide to cool the water by direct heat transfer and to supply carbon dioxide gas for carbonating the water, the receptacle being in communication with the vessel for flow of carbon dioxide gas from the receptacle into the vessel to carbonate water in the vessel, a sirup tank, and a dispensing faucet connected to the vessel and sirup tank. If more than one kind of carbonated beverage is to be dispensed, a plurality of sirup tanks may be provided, and a selective mixing faucet adapted for mixing a selected sirup with the carbonated water from the vessel may be connected to the vessel and the respective sirup tanks. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which one of various possible embodiments of the invention is illustrated, Fig. 1 is a plan view of a portable beverage dispenser of this invention;

Similar reference characters indicate corresponding parts throughout the several views of the drawing.

Figure 1:
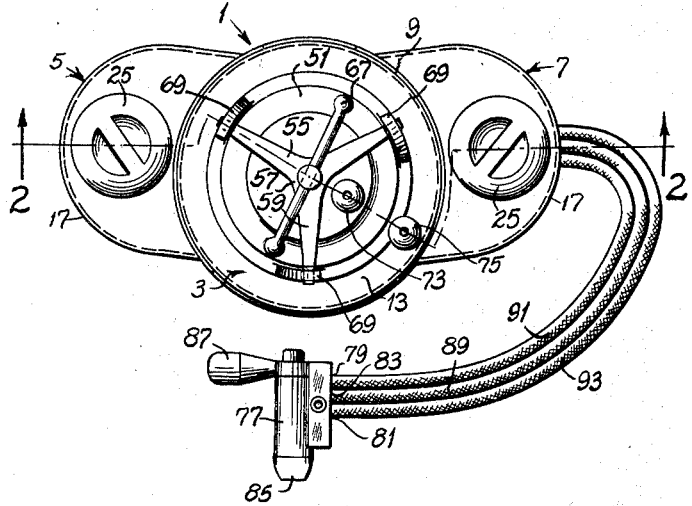
Figure 2:
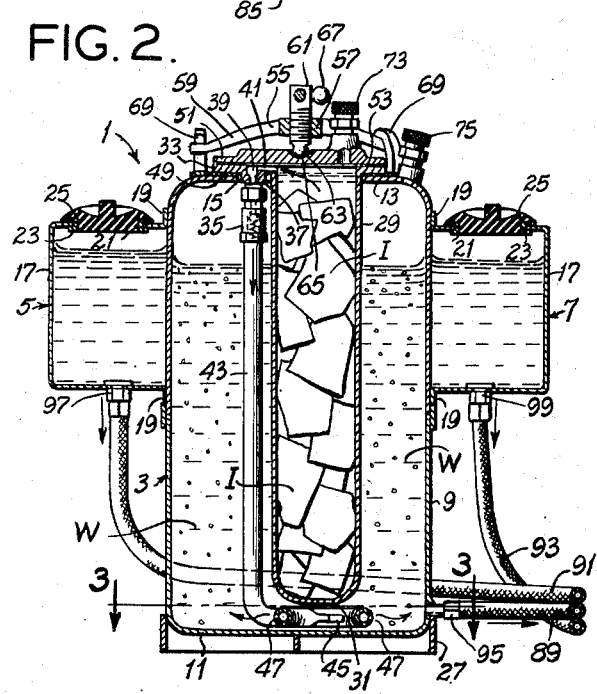
Fig. 2 is a vertical section taken substantially on line 2—2 of Fig. 1.
Figure 4:
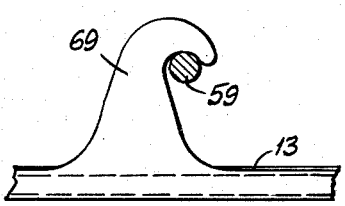
Fig. 4 is an enlarged fragmentary detail elevation.
Figure 3:
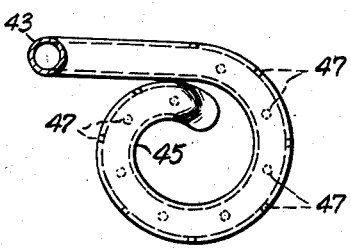
Fig. 3 is an enlarged horizontal section taken on line 3—3 of Fig. 2.

Referring to the drawing, a portable beverage dispenser of this invention, generally designated 1, is shown to comprise a pressure vessel 3 and two sirup tanks or containers 5 and 7. The vessel 3 constitutes a tank for a quantity of water to be carbonated and for the resultant carbonated water supply. It comprises a cylindrical container 9 having a bottom 11 and a top 13, the latter having a central filling opening 15. Each of the sirup containers consists of an open-sided casing 17 having a flange 19 around its open side by means of which it is attached to the container 9 as by welding, the wall of the container closing the open sides of the two casings. As shown, the two casings are attached to the container 9 on opposite sides of the latter adjacent its upper end. Each of the sirup containers has a filling opening 21 in its top, with a resilient ring 23 fitted in the opening. Plugs or caps 25 fit tightly but removably in the rings to close the filling openings. The container 9 may have an open-frame base 27 on its bottom to space the bottom of the container from whatever it may be resting upon.

Within the container 9 is mounted a smaller thin-walled metal container or receptacle 29 for containing cracked solidified carbon dioxide I to supply carbon dioxide gas for carbonating water in the container 9 and also to serve as a refrigerant for the carbonated water in the container 9. The solidified carbon dioxide cools the water principally by heat exchange through the wall of the container 29. The latter consists of an elongate tubular receptacle of smaller diameter and lesser height than the container 9, extending vertically downward from the top of the container, and having a closed bottom 31. The container or receptacle 29 has an outwardly extending flange 33 at its upper end. This flange consists of a flat eccentrically apertured ring of larger diameter than the opening 15 secured to the upper end of the tubular receptacle 29 as by welding. The receptacle opens at its upper end through the eccentric aperture in the ring and is thus disposed off center with respect to the ring. The inlet end of a gas check valve 35 is coupled to a nipple 37 on the bottom of the ring closely adjacent the receptacle 29. This check valve is adapted to open when gas pressure in its inlet exceeds the pressure in its inlet by a predetermined and relatively small amount, for example, 12 p. s. i. Its principal purpose is to prevent back flow of water from the container 9 into the solidified carbon dioxide chamber 29. The ring has a passage 39 leading through it from its upper face and through the nipple, and its upper face is grooved as indicated at 41 from the aperture in the ring and the open upper end of the receptacle to the passage 39.

A pipe 43 extends downward from the outlet end of the check valve alongside the receptacle 29. The lower end portion of the pipe is bent and coiled into a horizontal spiral 45 underlying the bottom 31 of the receptacle. The spiral 45 of the pipe is provided with a plurality of gas outlet apertures 47. It is of smaller outside diameter than the aperture 15 in the top of the vessel 3. The assembly of the receptacle 29 and the pipe 43 is removably fitted into the vessel through the aperture 15, with the flange 33 bearing against a flat resilient packing ring 49 interposed between the flange and the top of the vessel. The nipple 37 extends down into the vessel through the aperture in the packing ring and the aperture 15 in the top of the vessel.

The container 9 and the receptacle 29 are both closed by a pressure head 51 which bears against a flat resilient packing ring 53 interposed between the pressure head and the upper face of the flange 33. The aperture in the ring 53 is large enough not to close off the passage 39 and groove 41. The head 51 is forced into pressure engagement with the packing ring 53 by a quickly removable clamping means including a spider 55 having a central hub portion 57 and a plurality of arms 59 (three being shown) extending radially from the hub 57. A clamp screw 61 is threaded through the hub and is formed at its lower end with a rounded nose 63 adapted to bear against the pressure head 51, preferably in a rounded depression 65 formed in the upper face of the head. A handle 67 is provided on the upper end of the screw 61. The ends of the arms 59 engage under fixed clamp jaws in the form of hooks 69 which extend upward from the top of the container 9.

By backing off the clamp screw 61, the spider 55 may be loosened, turned to disengage the ends of the arms 59 from under the hooks 69, and removed. The pressure head 51 may then be taken off, and the assembly of the flange 33, receptacle 29, and pipe 43 removed for filling the container 9 with water through the opening 15 in its top. The receptacle 29 may be filled with cracked solidified carbon dioxide through its open upper end. The filled receptacle 29 may then be replaced in the vessel, the pressure head 51 applied, and clamped in place by positioning the spider 55 with the ends of the arms under the hooks 69 and turning the screw 61 to force the pressure head 51 against the packing ring 53. This seals both the receptacle 29 and also the container 9 against escape of pressure.

With the water container 9 and the receptacle 29 sealed by the pressure head 51, the receptacle is in communication with the container 9 through the groove 41, the passage 39, the check valve 35 and the pipe 43 and the outlet apertures 47 in the spiral end portion 45 of the pipe. As pressure builds up in the receptacle 29, the check valve opens and carbon dioxide gas flows out of the apertures 47 and bubbles up through the water in the container 9 to carbonate the water. A gas vent valve 73 is provided on the pressure head 51 in communication with the interior of the receptacle 29 to limit the pressure that may build up therein to about 120 p. s. i., for example. As illustrated, this valve is adjustable to vary this limiting pressure if desired. A gas vent valve 75 is provided on the top 13 of the container 9 to limit the pressure that may build up in the container. This valve is adjustable for setting it to vent the chamber at either of two different selected pressures, one the same as the pressure setting of the valve 73, preferably about 120 p. s. i., the other a lower pressure, preferably about 90 p. s. i.

At 77 is shown a selective mixing faucet having two sirup inlets 79 and 81, respectively, a carbonated water inlet 83, an outlet 85 and a handle 87. This faucet is of a type whose handle may be turned in one direction from closed position to mix and dispense carbonated water and sirup from one sirup inlet, or turned in the other direction to mix and dispense carbonated water and sirup from the other sirup inlet. This type of faucet is well known in the art. Flexible hose lines 89, 91 and 93 respectively connect a carbonated water outlet 95 adjacent the bottom of the vessel 3 and sirup outlets 97 and 99 in the bottoms of sirup containers 5 and 7 with the carbonated water inlet 83 and the sirup inlets 79 and 81 of the faucet.

The beverage dispenser 1 is of such size and weight that, when filled, it may be readily carried by a vendor of drinks as by a shoulder strap. It is contemplated that the receptacle 29 be of such size as to hold about two pounds of solidified carbon dioxide, the vessel 3 about two and one-half gallons of water (with the receptacle 29 in the vessel), and each of the sirup containers 5 and 7 about sixty ounces of sirup. This provides for vending of about fity mixed drinks of usual six-ounce size (one ounce of sirup, five ounces of carbonated water) from one filling of the dispenser, with the dispensed drinks at the desired cold temperature. It is desirable to supply more than enough sirup of each kind for fifty drinks so as to provide sufficient gravity head for sirup to flow to the mixing faucet when the last few drinks are dispensed.

In use, the container 9 is filled with water, the sirup containers 5 and 7 with different kinds of sirup, and the receptacle 29 with cracked solidified carbon dioxide, after which the receptacle 29 is inserted into the container and the pressure head 51 applied and clamped in place. Caps 25 are applied to close the sirup containers. The valve 73 is originally set to retain about 120 p. s. i. pressure in the receptacle 29 and maintained at this setting. The valve 75 is initially set to retain about 120 p. s. i. pressure in the vessel 3 for carbonating, and this setting is maintained for the time required to carbonate and cool the water in the container. Then, the valve 75 is reset to hold about 90 p. s. i. pressure in the vessel 3 for dispensing.

To dispense a drink, the faucet handle 87 is turned to open one or the other of the sirup inlets 79 or 81 and the carbonated water inlet 83. Pressure in the vessel 3 forces cold carbonated water W out of the vessel through the hose line 89 and the faucet outlet 85. The selected sirup flows by gravity from its container through its hose line, and mixes with the carbonated water flowing out of the faucet to dispense a mixed, cold drink.

It will be understood that the water in the container 9 is cooled by the charge of solidified carbon dioxide in the receptacle 29 due to direct heat exchange through the wall of the receptacle. In practice, a thick coating of ice forms around the receptacle 29 and this maintains the carbonated water cold even after the solidified carbon dioxide has all gassified. The arrangement with the receptacle 29 extending down into the water in the container 9 is advantageous in providing for heat transfer in respect to the water throughout practically the entire surface area of the receptacle when the container 9 is full of water.

Utilizing the principles of the invention, a beverage dispenser for dispensing about fifty mixed drinks may be constructed weighing no more when filled with water, sirup and solidified carbon dioxide than the usual beverage vendor's bucket, ice and half as many bottled drinks.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. A portable beverage dispenser comprising a water container having an opening in its top and a bottom outlet, a heat-transfer receptacle for solidified carbon dioxide having an open upper end and an outwardly extending flange surrounding said end, said receptacle being mounted within the container through said opening with said flange bearing against the top of the container around the opening, a pressure head bearing against the flange and closing the receptacle, clamping means reacting from the container and bearing against the pressure head to force it against the flange thereby to seal both the container and the receptacle, said receptacle being in communication with the container through a check valve adapted to permit flow of gas from the receptacle into the container and to prevent flow of water from the container into the receptacle, a sirup tank carried by the container having a filling opening and a bottom outlet, and a dispensing faucet connected to the container and sirup tank outlets.

2. A portable beverage dispenser comprising a water container having an opening in its top and a bottom outlet, a heat-transfer receptacle for solidified carbon dioxide having an open upper end and an outwardly extending flange surrounding said end, said receptacle being mounted within the container through said opening with said flange bearing against the top of the container around the opening, a pressure head bearing against the flange and closing the receptacle, clamping means reacting from the container and bearing against the pressure head to force it against the flange thereby to seal both the container and the receptacle, said receptacle being in communication with the container through a check valve adapted to permit flow of gas from the receptacle into the container and to prevent flow of water from the container into the receptacle, a sirup tank carried by the container having a filling opening and a bottom outlet, a dispensing faucet connected to the container and sirup tank outlets, a gas vent valve mounted on the pressure head for venting the receptacle if pressure therein should exceed a predetermined value, and an adjustable gas vent valve mounted on the top of the container for regulating the pressure retained in the container.

3. A portable beverage dispenser as set forth in claim 2, wherein the check valve has its inlet end coupled to the bottom of the flange, and the flange is formed to provide a passage from the receptacle to the valve inlet, and wherein a pipe extends downward from the outlet end of the check valve alongside the receptacle and has its lower end formed into a spiral under the lower end of the receptacle, the spiral end portion of the pipe having gas outlet apertures therein.

4. A portable beverage dispenser as set forth in claim 2 wherein the faucet is connected to the container and sirup tank outlets by flexible hose lines.

5. A portable beverage dispenser as set forth in claim 2 wherein the clamping means comprises a spider having arms radiating from a central hub and a clamp screw threaded through the hub, and the container is provided at its top with hooks under which the ends of said arms are removably engaged.

6. In apparatus of the class described, a water container having an opening in its top, a container for solidified carbon dioxide extending vertically within the water container, said solidified carbon dioxide container comprising an elongate tubular receptacle having an outwardly extending flange at its upper and open end and closed at its bottom, said receptacle being removably fitted into the container through said opening with the flange bearing against the top of the container around the opening, a pressure head bearing against the flange and closing the receptacle, clamping means reacting from the container and bearing against the pressure head to force it against the flange thereby to seal both the container and the receptacle, and means providing a gas passage leading from the receptacle above the level of water in the water container toward the bottom of the water container.

7. A carbonated beverage dispenser comprising a vessel having a liquid chamber and a refrigerant chamber in heat-exchange relation, said refrigerant chamber being adapted to receive solidified carbon dioxide and being in communication with the liquid chamber through a check valve adapted to open to permit flow of carbon dioxide gas from the refrigerant chamber to the liquid chamber when the differential between the pressure in the refrigerant chamber and the pressure in the liquid chamber exceeds a predetermined value, a faucet having its inlet in communication with the liquid chamber, a gas check valve having its inlet in communication with the refrigerant chamber, and a gas check valve having its inlet in communication with the liquid chamber, the latter valve being adjustable to regulate the pressure which it will retain in the liquid chamber.

RONALD F. TOLAN.

REFERENCES CITED

The following references are of record in the file of this patent:

UNITED STATES PATENTS

| Number | Name | Date |
|---|---|---|
| 283,060 | Bailey et al. | Aug. 14, 1883 |
| 1,409,827 | Callahan | Mar. 14, 1922 |
| 1,987,323 | Carroll et al. | Jan. 8, 1935 |
| 2,203,710 | Young | June 11, 1940 |